United States Patent
Wada et al.

[11] 3,842,929
[45] Oct. 22, 1974

[54] AUTOMATIC SEAT BELT APPLYING DEVICE

[75] Inventors: Akihiro Wada, Chiryu; Fumio Sugiura, Aichi; Masaki Ooka, Toyota, all of Japan

[73] Assignee: Toyota Jidosha Kogyo Kabushiki Kaisha, Aichi-ken, Japan

[22] Filed: Feb. 6, 1973

[21] Appl. No.: 330,082

[30] Foreign Application Priority Data
Feb. 8, 1972  Japan.............................. 47-13759

[52] U.S. Cl........................ 180/82 C, 280/150 SB
[51] Int. Cl. ............................................ B60r 21/02
[58] Field of Search ............ 180/82 C; 280/150 SB; 242/107 SB; 74/422; 297/385

[56] References Cited
UNITED STATES PATENTS

| | | | |
|---|---|---|---|
| 2,858,144 | 10/1958 | Oppenheim ............ | 280/150 SB |
| 2,937,882 | 5/1960 | Oppenheim ............ | 280/150 SB |
| 3,163,054 | 12/1964 | Werner .................. | 74/422 |
| 3,487,709 | 1/1970 | Zieber .................... | 74/422 |
| 3,506,083 | 4/1970 | Botnick .................. | 280/150 SB |
| 3,554,577 | 1/1971 | Hane ...................... | 280/150 SB |
| 3,679,229 | 7/1972 | Weststrate ............. | 280/150 SB |
| 3,680,883 | 8/1972 | Keppel ................... | 280/150 SB |
| 3,684,310 | 8/1972 | Weststrate ............. | 280/150 SB |

Primary Examiner—David Schonberg
Assistant Examiner—Terrance L. Siemens
Attorney, Agent, or Firm—Stevens, Davis, Miller & Mosher

[57] ABSTRACT

The seat belt applying device comprises a shoulder belt drive assembly for confining the shoulders of an occupant and a lap belt drive assembly for confining the waist of the occupant. Each assembly has a guide rail which guides and reciprocates a belt and a wire which is set in place through the guide rail. The wire is driven by a drive means connected with an electric circuit comprising a door switch which is turned on or off by the operation of a door lock device and limit switches which are operated when they come in contact with a belt hanger, thus confining the occupant automatically when the door is closed.

4 Claims, 13 Drawing Figures

AUTOMATIC SEAT BELT APPLYING DEVICE

The present invention relates to a seat belt guide device for use in a vehicle, and more specifically, to improvements in a self-fastening seat belt applying device which confines an occupant or releases the occupant from confinement automatically in correspondence with opening or closing of the door of a vehicle.

In a prior art self-fastening seat belt applying device of this type, in the manufacturing line of vehicles, individual members are assembled directly on designated positions of the inside plate of a door, and interior finishing of the door is conducted after respective members have thus been assembled. Therefore, the interior finishing processes are divided, thus resulting in that not only the finish may become unsightly, but a lot of hours are required for completing the whole assembly operation; also control of respective members becomes complicated, and hence, costly. Furthermore, in the conventional method the devices do not perform uniformly, require an undue amount of time and expense since they can be made only after the interior finish of the door is removed, and in the case of setting a conventional seat belt applying device in place on a finished vehicle the vehicle has to be modified to a considerable extent.

A conventional self-fastening seat belt driving device comprises a motor, a reduction gear, a guide sprocket or a guide pulley set in place opposite to a sprocket or a pulley connected with the reduction gear, a cable or the like being arranged between counterparts in an endless manner, and a seat belt applying device is caused to reciprocate. Therefore, the entire device necessarily becomes large, and a slip occurring in between respective members, or other irregularity, is apt to result in the absence of security and stability of operation; further, the members are prone to deformation or strain, the repair of which requires a great many hours, all constituting inherent defects.

Furthermore, a conventional seat belt guide rail is arranged to form a virtually linear line along a diagonal connecting the lower section in the rear on the internal surface of a door with the front upper section of the door. Therefore, only the both ends of the rail constitute a position to confine an occupant and a position not to confine the occupant, or a free position for the occupant to get in or out of the vehicle, which constitutes such defects that the position of the seat can be neither adjusted to move forward or rearward, nor corresponded to the number of occupants, that even in an unconfined state the upper butt end of the guide rail still confines the position of the seat until the seat belt cannot be advanced sufficiently forward, thus being apt to prove a hindrance to getting into or out of a vehicle.

An object of the present invention lies in providing a self-fastening seat belt applying device constructed into one single assembly of such respective members as a guide hanger of a shoulder belt or a lap belt, a guide wire thereof, and the driving gears of the guide rail and the guide wire.

Another object of the present invention lies in providing a seat belt applying device which can be assemled readily on the interior finished surface of the door as well as the roof side rail in the vehicle by designing proper unit components of respective members.

Another object of the present invention lies in providing a seat belt applying device having improved uniformity and the stability of performance, which can be efficiently manufactured in the course of manufacturing the vehicles, and the repair of which is facilitated.

Another object of the present invention lies in providing a seat belt driving gear which is compact in construction has excellent security and stability of operation, and can be readily repaired.

Another object of the present invention lies in providing a guide rail which has a space for guiding a seat belt to a position for confining an occupant sufficiently and comfortably, and has a space for guiding the seat belt as much as necessary to such a position as to enable the occupant to get into or out of the vehicle.

Other miscellaneous purposes, features and advantages of the present invention will be explained more distinctly in the following description.

Figure 2:
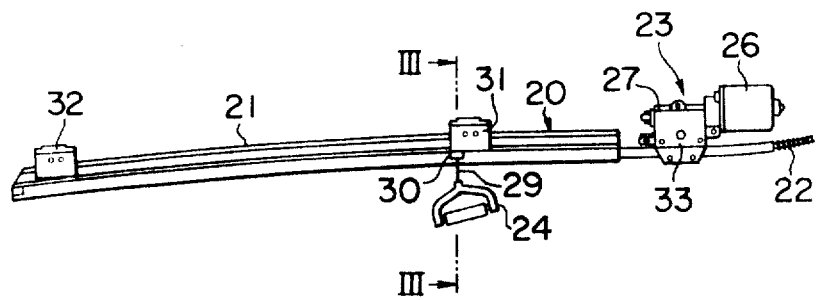
FIG. 2 is a front view of the shoulder belt assembly shown in FIG. 1.
Figure 4:
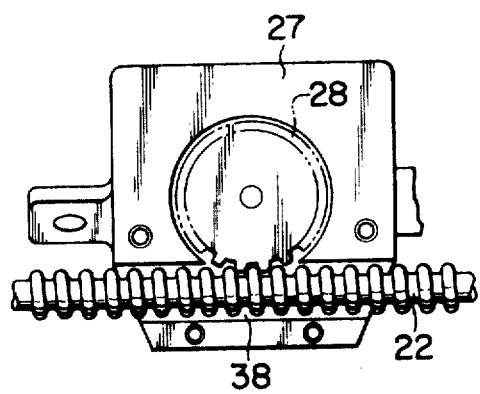
Figure 6:
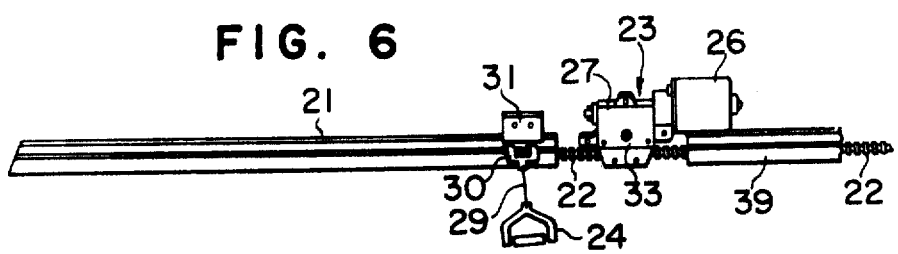
Figure 7:
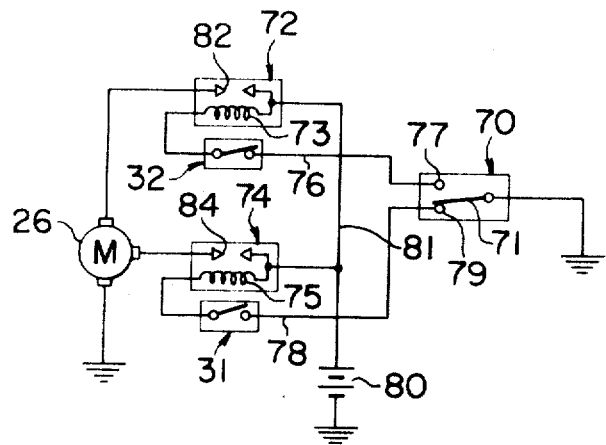
Figure 5:
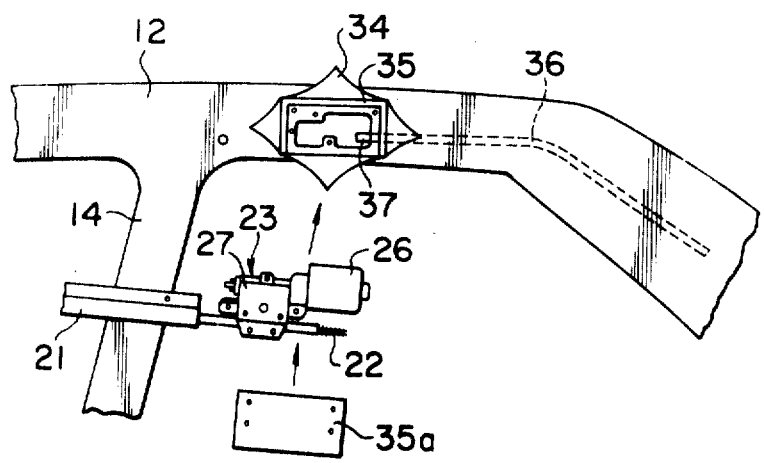
Figure 9:
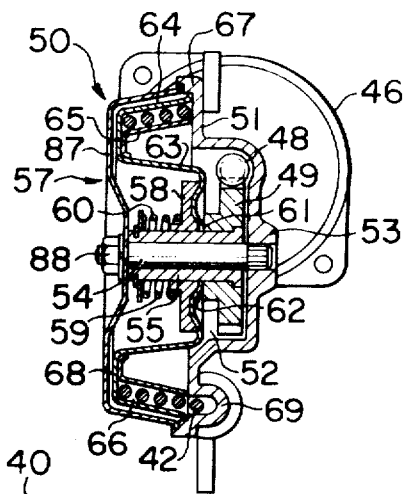
Figure 8:
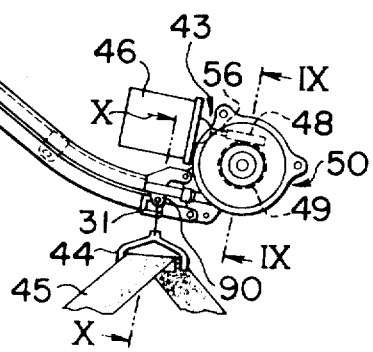
Figure 12:
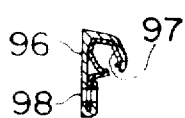
Figure 11:
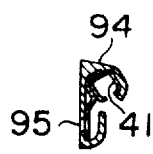
Figure 10:
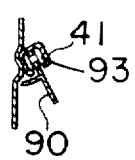
Figure 13:
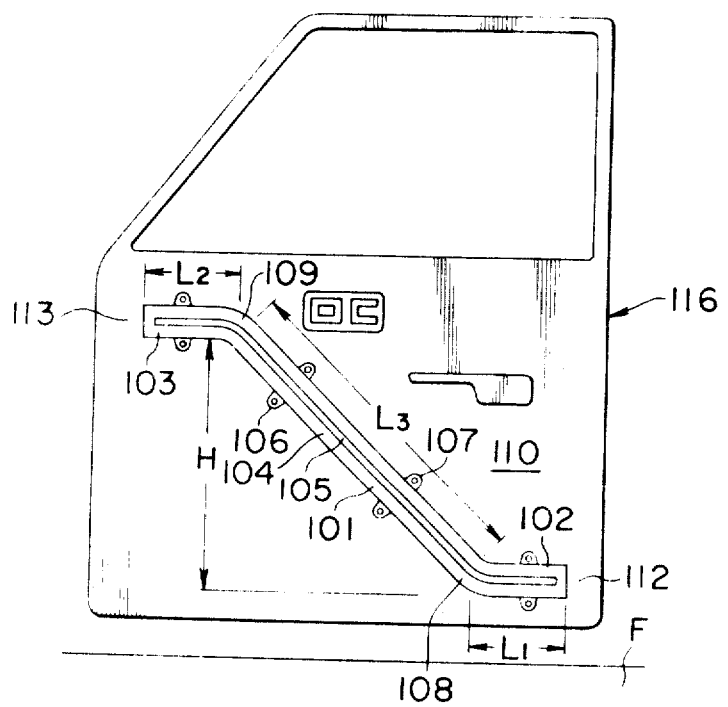

FIG. 4 is an enlarged front view specifically showing the driving gear depicted in FIG. 2 with the cover plate thereof removed, FIG. 5 shows the driving gear section of the shoulder belt assembly in the course of assembly thereof into the roof side of a vehicle, FIG. 6 shows another example of the shoulder belt assembly, FIG. 7 is an electrical circuit diagram for winding the shoulder belt into place, FIG. 8 shows a front view of a lap belt assembly to be set in place on the side of the door, FIG. 9 is an enlarged section thereof along the IX—IX line shown in FIG. 8, FIG. 10 and FIG. 11 are enlarged sections along the X—X line and the XI—XI line, respectively, shown in FIG. 8, FIG. 12 shows a modification of what is shown in FIG. 11, and FIG. 13 is a front view of the door showing another example of the guide rail of the lap belt.

Figure 1:
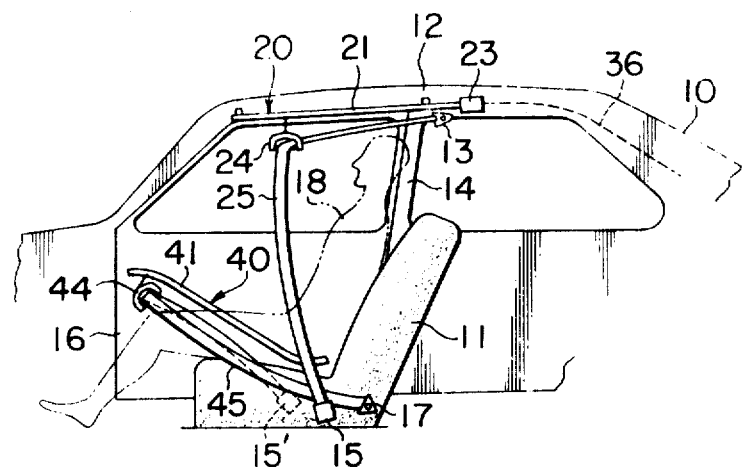
FIG. 1 shows the seat belt applying device for confining an occupant in the driver's seat of a vehicle of the present invention.

In FIG. 1, the seat belt applying device has a shoulder belt assembly 20 and a lap belt assembly 40 for confining an occupant 18 sitting on the front seat 11 of the vehicle 10. The shoulder belt assembly 20 comprises a guide rail 21 set in place along a roof side rail 12, a drive means 23 for operating a geared wire 22 arranged through the interior of a guide rail 21, a hanger 24 to be guided by the guide rail 21, and a shoulder belt 25 supported loosely by the hanger 24. One end of the shoulder belt 25 is fixed on a catching device 13 set in place adjacent to a center pillar 14 of a vehicle, and the other end thereof is fixed on a retractor 15 set in place on the lower left section of the seat 11.

The lap belt assembly 40 comprises a guide rail 41 arranged diagonally on the inside of a door 16, a drive means for operating a wire arranged through the guide rail 41, a hanger 44 to be guided by the guide rail 41, and lap belt 45 supported loosely by the hanger 44. The lap belt 45 has one end thereof fixed on a catching device 17 set in place at the lower left end of the seat 11 and the other end thereof fixed on the retractor 15' arranged at the right corner of the door 16 or on the floor of the body of a vehicle.

Each one of the belts 25, 45 is moved into a confining state when the door is closed, irrespective of whether or not an occupant is seated FIG. 1 shows the state immediately after an occupant 18 is seated, with the shoulder belt 25 and the lap belt 45 being loosened. However, when the door 16 is closed tight and completely, respective drive means are placed in operation, the shoulder belt 25 is tensioned from the left waist to the right shoulder of the occupant, and the lap belt 45 is set in place on the abdominal region, thus confining the occupant automatically on the shoulder and the waist.

SHOULDER BELT ASSEMBLY

Figure 3:
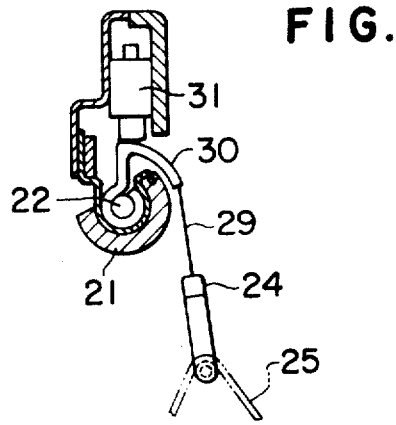
FIG. 3 is a section along the III—III line shown in FIG. 2.

FIG. 2 through FIG. 5 show the shoulder belt assembly 20, and arranged at the right end of the guide rail 21 is a drive means comprising a drive motor 26 which revolves in the normal or reverse direction as the door is opened or closed in a corresponding manner, and a reduction gear 27. The reduction gear has a pinion 28 arranged at the final stage thereof in such a manner as shown in FIG. 4 with a front cover 33 of the drive means 23 removed off position, and it is geared with a geared wire 22 arranged through and in a slot 38 set in place orthogonally therewith. The geared wire 22 is made of a material which has enough rigidity to be pushed and pulled. Therefore, when the pinion 28 revolves clockwise, the geared wire 22 is extruded into the guide rail 21 (in the leftward direction in FIG. 4), meanwhile, when the pinion 28 revolves counterclockwise, the geared wire 22 is pulled back until it is caused to move in the rightward direction in FIG. 4. The geared wire 22 has a slide member 30 fixed on the top thereof as shown in FIG. 2 and FIG. 3, and has a member 29 for hanging a cord or a wire set in place on a slide member 30. The bottom end of the member 29 has a hanger 24 for supporting the shoulder belt 25 suspended therefrom. Arranged adjacent to the both ends of the guide rail 21 are limit switches 31, 32 each of which opens the electric circuit when the slide member 30 is touched by them. Each one of these limit switches 31, 32 is connected with an electric circuit which will be described later with regard to FIG. 6.

FIG. 5 is a drawing of the drive means 23 of the shoulder belt assembly 20 with a part thereof specifically disassembled for the purpose of showing the state of mounting the drive means 23 on the body of the vehicle.

As shown in the drawing, the guide rail 21 is fixed directly on the interior finished surface of the roof side rail 12 of a vehicle by the means of screws or the like. However, the drive means 23 is set in place on a block 35 arranged on the body of the vehicle by the employment of such fixing means as screws or the like and a cover 35a as shown in FIG. 5 with a part of an interior finishing sheet 34 of the roof side rail 12 specifically taken off position. Furthermore, a sheath 36 for enclosing the geared wire 22 pulled back from the guide rail 21 is flushed in the roof side of the block 35 and in the rear thereof, and the top 37 of the sheath has an opening through the block 35, thus causing one end of the geared wire 22 to be inserted therethrough at the time of assembly.

FIG. 6 shows another type of the shoulder belt assembly 20, and in this case a rear guide rail 39 is arranged in the rear of the reduction gear 27, thus causing the geared wire 22 to be guided in a regular manner.

The illustration introduced above has the block 35 buried flush in advance in the roof side rail 12 in the course of the production line of the vehicle, therefore, assembly can be completed in a neat manner as far as the appearance is concerned. In the case of mounting the above-mentioned assembly on a vehicle that has been already manufactured, the assembly can be mounted in place readily enough on the roof side rail 12 by fixing the assembly at respective predetermined positions by means of screwing, free from the trouble of burying flush the block 35; furthermore, the construction of the assembly in a compact manner serves to leave the space in the vehicle free from being narrowed thereby.

WORKING ELECTRIC CIRCUIT

FIG. 7 shows the working electric circuit for the operation of the shoulder belt.

This electric circuit comprises a switch 70 for changing over a contact 71 in correspondence with the opening and closing of the door 16, a motor that can be operated in the regular and reverse directions selectively, an electric power source 80, a couple of relays 72, 74 connected in parallel with a power source circuit 81, a line 76 that is furnished with a relay coil 73 and a limit switch 32 and is connected with one terminal 77 of the door switch 70, and line 78 that is furnished with a relay coil 75 and a limit switch 31 and is connected with the other terminal 79 of the door switch 70. Shown in FIG. 2 is the shoulder belt assembly in a confined state of the belt 25, when the door is closed. The hanger for guiding the shoulder belt 25 stops adjacent to the rear end of the guide rail 21, and the slide member 30 is in contact with the limit switch 31, therefore, the limit switch 31 is in the state of OFF, while the other limit switch 32 is in the state of ON.

The door switch 70 causes no electric current to run into the power source circuit 81, since the door is closed and the contact 71 is in contact with the terminal 79 of the line 78, therefore, the drive means 23 is in the state of suspension. When the door is opened and the door lock is released under such a state as this, the contact 71 of the door switch 70 is changed over to the side of the terminal 77 of the line 76, the relay contact 82 is closed by the charge of the relay coil 73, and the motor 26 is caused to revolve in the normal direction. The pinion 28 of the drive means 23 is caused to revolve clockwise in the case shown in FIG. 4, by being driven by the motor; accordingly the geared wire 22 is extruded from the right to the left in the interior of the guide rail 21. As the geared wire 22 is thus cause to move, the rear end thereof is pulled out of the sheath 36 in a gradual manner, while the slide member 30 on its part comes in contact with the limit switch 32 when it reaches the top end of the guide rail 21, until the limit switch 32 is turned off. While the geared wire 22 is extruded and the slide member 30 travels along the guide rail 21 in such a manner as set forth above, the belt 25 is supported by the hanger 24 is caused to move to the unconfined position in a gradual manner, and the length of the belt 25 necessitated in pursuance thereto is so designed as to be rewound by the retractor 15. When the slide member 30 reaches the limit switch 32 arranged adjacent to the top of the guide rail 21, a touch of the slide member 30 brings the limit switch 32 to the state of OFF. The motor 26 is put out of operation, and the tension of the front belt of the seat 11 is thus intensified, until the occupant 18 is allowed to get to the seat 11.

When the occupant 18 thus takes the seat 11 and closes the door 16, the door switch 70 shown in FIG. 7 returns to the original position, i.e., the contact 71 and the terminal 79 come in contact with each other. Now that the limit switch 31 is ON and the limit switch 32 is OFF at this juncture, the relay coil 75 is energized, closure of the relay contact 84 causes the motor 26 to revolve in the reverse direction, and the pinion 28 is reversed accordingly, thus pulling back the geared wire 22 arranged in the guide rail 21. As the slide member 30 fixed on the geared wire 22 thus starts its action in the reverse direction, the belt 25 is placed under a confined state, and the loose part is properly absorbed by the retractor 15.

Now that in the present invention a geared wire having such rigidity as enables the geared wire to be pushed and pulled is caused to travel forward and rearward under the state of being engaged with a driving gear, or a pinion, as set forth above, it has such an effect that a seat belt can be guided in a powerful, secure and feasible manner. Furthermore, now that it can be constructed into a compact entity and a single wire is caused to reciprocate in the principal mechanism thereof, the device in its entirety can be made solid enough, therefore, it displays such superb effects that the action thereof is secure and stabilized enough, and that it can be subjected to maintenance and repair readily enough, hence resulting in considerable improvement in the durability thereof.

LAP BELT ASSEMBLY

FIG. 8 through FIG. 12 show details of the lap belt drive assembly shown in FIG. 1. This lap belt drive assembly is specifically designed to confine the waist of an occupant in correspondence with the opening and closure of the door 16.

The driving gear 43 comprising a motor 46 and a reduction gear 47 is arranged in the lower rear of the door 16, and the driving force thereof is transmitted to a wire winding mechanism 50 through a worm 48 and a worm wheel 49 as shown in FIG. 8. With regard to a winding drum 57, a guide wire 42 which can be subjected to a push-pull action is set in place in a guide rail 41, and one end thereof is fixed securely enough.

The wire winding mechanism 50 has the bottom end of a rigid shaft 54 fixed on a bearing 53 arranged at the center of a concavity 52 of a cylindrical shape formed in the center of the main body 51. A rotary sleeve 55 is fitted on the rigid shaft 54 to be free to revolve. The rotary sleeve 55 has the worm wheel 49 fixed thereon in such a manner as to conduct a reducing operation, and the worm wheel 49 is engaged with the worm 48 of a driving shaft 56 of the motor 46 projected into the concavity 52. One side 61 of the winding drum 57 is pressed on the side 62 of the worm wheel 49 by virtue of the elasticity of a helical spring 60 set in place on a supporting disk 59 fixed at the end, and the revolution of the worm wheel 49 is transmitted to the winding drum 57 by virtue of the frictional force thereof.

The winding drum 57 has a winding clearance 66 of a head-cut conical shape formed of a couple of shell plates 64, 65 inside and outside, supported as one entity by a core plate 63. The winding clearance 66 has the side flange thereof covered by the side 67 of the main body 51 and the support 68 of the core plate 63, and is connected with the exterior in the tangential direction through a wire conduction section 69 arranged in the main body 51.

Furthermore, the rigid shaft 54 has a cover plate 87 for covering the winding drum 57 fixed in place by a nut 88, and the rotary sleeve 55 is held in place on a specified position by this fixing. One end of a wire 42, which is made of such synthetic resin as has a property rigid enough as to enable it to be pushed and pulled, is drawn into the depth of the winding clearance 66 through the wire conduction section 69, and it is fixed in place by an appropriate measure and then wound in a proper manner.

Now since the winding drum 57 has the revolution thereof transmitted by the frictional contact thereof with the worm wheel 49, the turning effort transmitted to the worm wheel 49 is transmitted as it is, thus either winding the wire 42 in the winding clearance 66 or extruding the wire 42 therefrom in such a manner as shown in the drawing, in case only such an external force is applied on the wire 42 as is below the specified frictional force thereof. Meanwhile, in case an external tensile force well over the frictional force is functioning on the wire 42, a slipping phenomenon occurs between the side 61 of the drum and the side 62 of the worm wheel, thus constituting a sort of safety mechanism. The wire 42 made of synthetic resin is inserted in a guide rail 41 which extends to the outside of the conduction section 69 arranged in the main body 51.

The guide wire 42 has a slide member 90 which has a guide hanger 44 for guiding the lap belt 45 suspended by means of a cord, a wire or the like specifically arranged and fixed on the top thereof, and the slide member 90 has a roller 93 which is free to roll in a guide rail 41 set in place in such a manner as shown in FIG. 10, thus enabling winding or rewinding by the winding drum 57, thereby causing the guide wire 42 to be free to travel under proper adjustment along the guide rail 41. Furthermore, the guide rail 41 has limit switches 31, 32 arranged at both ends thereof, and the limit switches 31, 32 are caused to come in contact with one side of the slide member 90 traveling in the guide rail 41, thus conducting suspension of the action of the driving gear 43.

The above-mentioned guide rail 41 is set in place in an enclosed manner in a cover 94 as shown in FIG. 11, and it is set in place on the interior finished surface of the door 16 by means of a setting section 95 of the cover 94. In the case of this illustration as well, the driving gear 43 also has a slide member set in place thereon for connection with the door 16. Furthermore, the driving gear 43, the guide wire 42, the guide rail 41, the cover 94, the slide member 90, and the guide hanger 44 are assembled into one entity in advance, thus constituting a single entity.

Shown in FIG. 12 is an illustration of a different guide rail from that shown in FIG. 11, and in this illustration a guide rail 96, a cover 97 and a setting section 98 are all molded into one complete entity. The driving gear 43 is fixed on a bracket arranged on the internal finished surface in the lower rear of the door 16, the guide rail 41 is fixed in place by means of a setting section 98 on the interior finished surface of the door 16 in a specified position thereof, and the assembly operation is thus completed.

With regard to the side of the lap belt assembly as well, applied thereto is exactly the same circuit as in the case of the aforementioned shoulder belt assembly as shown in FIG. 7, and each and every one of which is capable of confining and releasing an occupant in an automatic manner in correspondence with the opening and closing of the door 16.

Shown in FIG. 8 is such a state that the driving device so constructed as set forth above is applied to the door of an automobile. In this case a guide rail 41 is arranged from the front section through the rear section of the door 16'. One end of a wire, being made of synthetic resin and capable of being pushed and pulled, is set in place in the guide rail 41. A slide member 90 for the seat belt is projected outwardly from the clearance established in the longitudinal direction of the guide rail 41, and the seat belt is set in place therethrough.

FIG. 8 shows such a state that the door is locked and the seat belt is set at the position for confining an occupant. When the door lock is released from this state, it is so arranged concurrently that the motor 46 is started and the winding drum 57 is caused to revolve in the direction of winding through the reducing mechanism including a worm 48, a worm wheel 49 and so forth, and the wire 42 is wound back as the motor 46 revolves. Now since the wire 42 is made of a synthetic resin has sufficient rigidity to enable it to be pushed and pulled, it travels forward in the guide rail 41 as it is rewound, and the slide member 90 fixed on the butt end thereof travels together therewith. Therefore, the seat belt set in place therethrough is also guided by the slide member 90, and it is drawn forward to the front of the door 16 along the guide rail 41, thus being led to a position for releasing the occupant. When the door is closed, the motor is caused to revolve in the reverse direction, the wire 42 is wound, and as the butt end travels to the rear of the door 16 along the guide rail 41, the seat belt is led again to a position for confining the occupant.

The present invention is of such a construction and a function as set forth above, and an assembly of the guide members including a driving mechanism, a guide rail, a guide wire, a guide hanger and so forth which are consolidated into a single unit well enables the seat belt to be subjected to self-fastening simply and by merely setting it in place at a specified position on the interior finished surface of the roof side rail or on the door. Therefore the hours, the expenses, and so forth required for the assembly work can be curtailed a great deal, and the number of processes, as well as the number of component parts, can be considerably reduced, compared with any conventionally introduced method, thus featuring facilitation of control of the component parts and improvement in operational efficiency.

Furthermore, the present invention produces such multifarious effects that uniformity of performance of the automatic seat belt applying device occurs securely and readily enough, that repair work can be completed within a short time even in case the device should be found to be irregular, that the cost of repair is low enough, and that this device can be set in place on any finished vehicle readily enough, since the device itself is formed in a compact manner, that the device can be set in place readily enough, and that the action thereof has sufficient security.

FIG. 13 shows another illustration of the guide rail in the lap belt drive assembly. In this illustration, the lower section 102 of the guide rail 101 positioned in the lower rear of the interior surface of a door 116 is set virtually in parallel to the floor (F) of a vehicle for as long as a specified length ($L_1$) which is established in correspondence with the classification and the use of the vehicle. The upper section 103 of the guide rail positioned at the front upper section 113 of the interior surface of the door 116 is set virtually in parallel to the lower section 102 of the guide rail for as long as a specified length ($L_2$) which is established in correspondence with the classification and the use of the vehicle. The lower section 102 and the upper section 103 of the guide rail are connected with each other into one single entity at the intermediate section 104 of the guide rail running diagonally on the interior surface of the door 116.

Now, the length ($L_3$) of the intermediate section 104 of the guide rail and the height (H) from the lower section 102 of the guide rail up to the upper section 103 of the same are specified to be such that are necessary and sufficient to lead the seat belt from the position that confines an occupant to the position that releases the occupant from the confinement. The guide rail 101 employed in the illustration shown in FIG. 13 is so specified as to be a hollow member with a clearance 105 running in the longitudinal direction on the inside of the vehicle, and as to be set in place directly on the interior finished surface 110 of the door 116 by means of fixing tongues 106, 107, however, the application is not confined to such a construction as is introduced in FIG. 13, but the guide rail may well be in a cylindrical shape, rod-shaped, or otherwise, including such that the guide rail is arranged flush in the interior finish of the door, with the section of the clearance alone kept open along the interior finished surface.

With regard to this guide rail 101, a reciprocally traveling element like a wire is arranged in the guide rail. A hanger of the seat belt fixed on a part of the reciprocally traveling element is caused to be projected into the vehicle out of the clearance 105, and the seat belt is set in place through the hanger, in the like manner as in the case shown in FIG. 8, although such as omitted in the drawings.

In the present invention, the intermediate section 104 of the guide rail is given such length and height as is sufficient to lead the seat belt from the position for confining an occupant to the position for releasing the occupant from the confinement. Since the seat belt is placed at the position for confining an occupant at the lower end 108 of the intermediate section 104, the seat belt can further travel virtually in parallel to the floor (F) for as long as the length ($L_1$) at the lower section 102 of the guide rail, under the confining state.

Furthermore, at the upper end 109 of the intermediate section 104 of the guide rail, the seat belt is in the state of being completely released from the confinement, therefore, the seat belt can further travel virtually in parallel to the floor (F) in the forward direction of the door 116 for as long as the length ($L_2$) at the upper section 103 of the guide rail, under the release state, until it is led to such a position as is completely free from preventing an occupant from getting into or out of the vehicle.

Through materialization of the present invention, the seat belt is once caused to occupy the position for confining an occupant, and then it is caused to travel further for as long as a specified distance in the rearward direction of the door and virtually in parallel to the floor in such a manner as set forth above. Moving the position of the seat either forward or rearward, or adjusting the same otherwise, does not prevent the seat belt from being led to the complete confining position with relation to the seat of an occupant on any occasion; furthermore, the seat belt displays such a superb performance as to confine the occupant at a proper position in a sufficient and agreeable manner, within a specified range of travel of the seat, irrespective of the stature of the occupant seated on one and the same seat being husky or otherwise.

Furthermore, the seat belt can be moved in the forward direction of the door sufficiently from the unconfining position at the time of getting into or out of the vehicle by an occupant, and it has an effect as to lead the occupant to a position completely free to get into or out of the vehicle. In addition thereto, the intermediate section of the guide rail is given sufficient length and height, therefore, the functions of confining and releasing the occupant are completely free from being disturbed.

What is claimed is:

1. An automatic seat belt applying device for use in a vehicle, comprising:

a shoulder belt for confining the shoulder of an occupant;

a shoulder belt drive assembly comprising a first guide rail set in place along the roof side rail of a vehicle, a first wire having such rigidity as enables the first wire to be pushed and pulled and set in place in said first guide rail, a first driving gear set in place on said roof side rail and operatively connected with said first wire for reciprocating the first wire in said first guide rail, a first couple of limit switches arranged at both ends of said first guide rail, and a first slide member fixed on said first wire and loosely supporting said shoulder belt;

a lap belt for confining the occupant on the waist;

a lap belt drive assembly comprising a second guide rail set in place diagonally on the interior surface of a door facing the position for confining the occupant, a second wire having such rigidity as enables said second wire to be pushed and pulled and set in place in said second guide rail, a second driving gear set in place on said interior surface of the door and operatively connected with said second wire for reciprocating said second wire in said second guide rail, a second couple of limit switches arranged adjacent to the both ends of said second guide rail, and a second slide member fixed on said second wire and loosely supporting said lap belt;

said shoulder belt drive and lap belt drive assemblies being assembled respectively into one single entity; and an electric circuit for operating each of said first and second driving gears comprising a line having a door switch arranged on the grounding side of each one of said first and second limit switches, a line having each of said first and second limit switches connected in parallel to the power source line for said each driving gear, and a plurality of relays set in place for each and every one of said first and second limit switches.

2. The seat belt applying device of claim 1 wherein the second wire of said lap belt drive assembly is made of synthetic resin having sufficient rigidity that enables the second wire to be pushed and pulled with security and stability.

3. The seat belt applying device of claim 1 wherein a lower section of the second guide rail is positioned in the lower rear of the interior surface of a door and is set virtually in parallel to the floor surface of the vehicle for as long as a specified length, and wherein an upper section of said second guide rail is positioned in the upper front of the interior surface of the door and is set virtually in parallel to the lower section of the second guide rail, and wherein said upper and lower sections of said second guide rail are connected with each other into one single assembly at an intermediate section of the second guide rail which runs diagonally from the lower rear of the interior surface of the door up to the upper front of the same, and has a length and a height that leads the lap belt from an occupant confining position to an occupant unconfining position.

4. The seat belt applying device of claim 1, comprising a motor responsive to the opening and closing of the door to rotate in its normal or reverse directions;

a pinion attached to the axis of said motor;

a gear wire having a rigidity enabling push-pull actions and engaging with the pinion;

a guide metal element of the seat belt attached to one end of said gear wire; and a member such as a cord provided on said guide metal element, a hanger supporting the shoulder belt being attached to the bottom end of said member.

* * * * *

UNITED STATES PATENT AND TRADEMARK OFFICE
CERTIFICATE OF CORRECTION

PATENT NO. : 3,842,929
DATED : October 22, 1974
INVENTOR(S) : AKIHIRO WADA et al It is certified that error appears in the above-identified patent and that said Letters Patent are hereby corrected as shown below:

In the heading of the Patent, the second assignee was omitted. The assignee identification should be:

Toyota Jidosha Kogyo Kabushiki Kaisha,
Toyota, JAPAN and

Aisin Seiki Kabushiki Kaisha,
Asahi, JAPAN

Signed and Sealed this second Day of March 1976

[SEAL]

Attest:

RUTH C. MASON
*Attesting Officer*

C. MARSHALL DANN
*Commissioner of Patents and Trademarks*